US005523145A

United States Patent [19]

Buras, Jr.

[11] Patent Number: 5,523,145

[45] Date of Patent: Jun. 4, 1996

[54] METHOD FOR AFFIXING AN ATHELETE'S RACE TIME TO A GARMENT

[76] Inventor: Gilbert R. Buras, Jr., 5915 Vicksburg St., New Orleans, La. 70124-2949

[21] Appl. No.: 223,959

[22] Filed: Apr. 7, 1994

[51] Int. Cl.$^{6}$ .................... B32B 3/00

[52] U.S. Cl. .................... 428/195; 428/200; 428/488.4; 428/913; 428/914

[58] Field of Search .................... 156/235; 428/195, 428/200, 913, 914, 203, 488.4

[56] References Cited

U.S. PATENT DOCUMENTS

| | | | |
|---|---|---|---|
| 4,038,123 | 7/1977 | Sammis | 156/240 |
| 4,089,722 | 5/1978 | Holoubek | 156/235 |
| 4,224,358 | 9/1980 | Hare | 427/147 |
| 4,284,456 | 8/1981 | Hare | 156/234 |
| 4,367,252 | 1/1983 | Tordjman | 428/41 |
| 4,544,430 | 10/1985 | Shepherd | 156/235 |
| 4,564,406 | 1/1986 | Binks | 156/63 |
| 4,685,984 | 8/1987 | Power et al. | 156/155 |
| 4,980,224 | 12/1990 | Hare | 428/202 |
| 4,997,506 | 3/1991 | Recher et al. | 156/235.8 |
| 5,133,819 | 7/1992 | Croner | 156/230 |

*Primary Examiner*—Patrick J. Ryan
*Assistant Examiner*—William A. Krynski
*Attorney, Agent, or Firm*—Pravel, Hewitt, Kimball & Krieger

[57] ABSTRACT

A method for producing an article of clothing that bears an athlete's race time includes the placement of a plurality of indicia on the shirt after selected segments of the indicia have been manually removed from a paper or like backing. The indicia are arranged in pairs for minutes and seconds and there can be a third pair (or a single indicia) for indicating hours. Each of the indicia comprises six (6) peripheral segments arranged in a vertically extended rectangular, and one transverse horizontal internal segment. These segments thus have the shape of the number 8. The user can selectively remove any of the segments as desired to make any number 1–9 or 0. The indicia can be applied to the shirt or to a color contrasted background previously placed on the shirt using heat transfer, for example.

6 Claims, 2 Drawing Sheets

METHOD FOR AFFIXING AN ATHELETE'S RACE TIME TO A GARMENT

BACKGROUND OF THE INVENTION

1. Field of the Invention

The present invention relates to methods of affixing heat transferable material to garments such as T-shirts and the like, and more particularly relates to a method for affixing an athlete's race time to a garment with a plurality of segmented numbers arranged in pairs, wherein the segmented numbers include segments that are separately removable from a paper or like backing member so that the remaining segments define a selected number, and wherein the plurality of numbers can be transferred together to the garment using heat transfer after the desired segments have been removed.

2. General Background

Many organized running events award each of the finishers with a souvenir tee-shirt or like garment bearing the name of the race. Such souvenir shirts are commonly associated with long distance runs such as 5 kilometer, 10 kilometer, half marathon and marathon. Garments are also awarded at triathon events that include running, bicycling, and swimming. Most of these garments display the name of the event, the distance involved, and at times the host city. Many such garments provide a logo that is multicolored.

Successful runners devote a great deal of time when training for long distance running events. Their hard work is hopefully rewarded with a very good time that would desirably be displayed somewhere on the garment such as on the front or on a sleeve. However, each runner's time is different for a given event. A race can attract between one thousand and thirty thousand runners or more. Heretofore, it has been impossible for a race director to place each runner's time on his or her souvenir garment. Therefore, there is a need for a simple yet customized method of transferring a racers time directly to the souvenir garment or shirt, after the event.

SUMMARY OF THE PRESENT INVENTION

The present invention solves this problem by providing an easy to use method of placing a selectable time entry on an article of clothing for evidencing the athlete's race time after the event is completed. In the method of the present invention, a garment is provided of a desired color.

A first contrasting color transfer of a desired shape background (for example rectangular) is applied to the garment as a backing surface. For example, the rectangular backing can be black for light colored shirts, and can be applied using an iron or like heat transfer device.

A second transfer is formed of a plurality of indicia that are arranged in at least two adjacent pairs including a first pair of indicia to indicate seconds and a second pair of indicia to indicate minutes. A third indicia can be a single digit or a pair of digits to indicate hours. The combination of the pairs of digits define an athlete's race time in hours, minutes, and seconds.

Each indicia is preferably comprised of a plurality of seven (7) segments including a plurality of six (6) separate peripheral segments and at least one interior segment. The segments can be modified by the user to define a selected number 1, 2, 3, 4, 5, 6, 7, 8, or 0, by selectively removing one or more of the segments from the indicia.

When the plurality of indicia are generally horizontally aligned, they define the race time. The different selected indicia can be formed by manually pealing an undesired segment (or segments) from the transfer. The plurality of segments are preferably of a thermal curred ink or adhesive material, placed on a suitable backing paper (transfer paper, for example). The user removes unwanted segments to designate the numbers constituting desired time. Once unwanted segments are removed, the plurality of indicia are applied to the garment. Heat and/or pressure is applied to the combination of the garment, the backing, and the indicia to effect transfer to the garment.

In the preferred embodiment, the indicia are generally in the shape of the number "8" and include a plurality of six peripheral segments arranged in a generally rectangular shape and a single horizontally extending internal segment. By removing the single horizontal segment, the number "0" is formed. By removing the top segment, the bottom segment, and the lower left segment, a "4" is formed. By removing the two left side segments, a "3" is formed, and so on.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
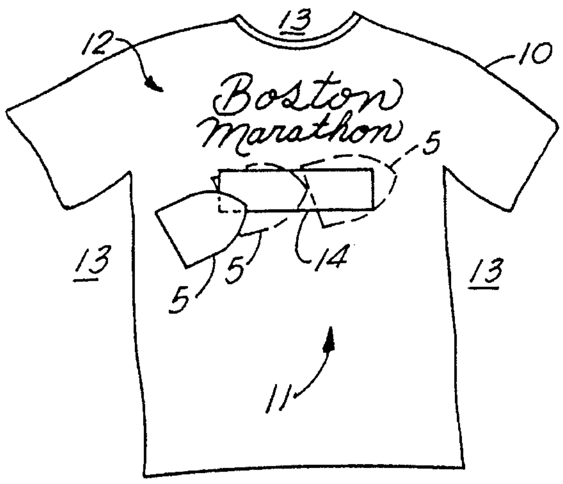
FIG. 1 is a schematic view of the first method step of the method of the present invention.

FIG. 1 illustrates the first step of the method of the present invention. In FIG. 1, a garment 10 such as a tee-shirt is shown having a front surface 11 that will carry an indication of an athlete's time, such as for example, the hours, minutes, and seconds of a marathon. Indicated generally at the numeral 12 is print that defines the race title which commonly appears on tee-shirts awarded as a souvenir for a well-known distance event.

In FIG. 1, the shirt 10 is placed on a flat underlying support surface 13, such as a table top. The user transfers heat to a first generally rectangular transfer 14 that can be of a color that contrasts with the color of the garment 10 and with the color of a plurality of indicia 15–19. The indicia are arranged in at least two pairs, including a first pair 20 for indicating seconds, and a second pair 21 for indicating minutes. Indicia 19 indicates hours.

Figure 2A:
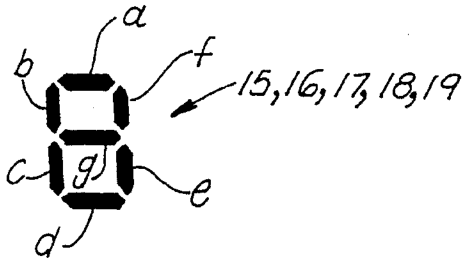
FIG. 2A is an enlarged view of an indicia showing the six (6) peripheral segments and one internal segment.
Figure 2:
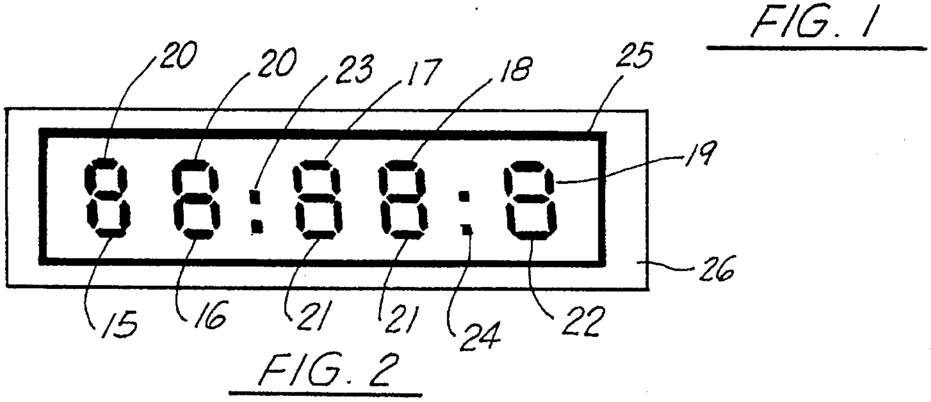
FIG. 2 is a schematic view of the preferred embodiment of the apparatus of the present invention showing the indicia, a peripheral border, and the backing paper portions thereof.

Colons 23, 24 can be used for separating the minutes and seconds 20, 21, and for separating the minutes and hours 21, 22 as shown in FIG. 2. A peripheral border such as rectangular border 25 can surround the combination of the various indicia 15–19 and the colons 23, 24 as shown in FIG. 2. The plurality of indicia 15–19, the colons 23, 24, and the border 25 are all placed on a paper backing element 26 that can be for example of a thermal cured ink material.

Each of the indicia 15–19, the colons 23–24, and the border 25 are of a heat transferable material such as transfer paper. As will be described more fully hereinafter, any portion of the indicia 15–19 can be removed by manually peeling an undesired segment. The indicia 15–19 are not permanently attached to the backing member 26.

Figure 4:
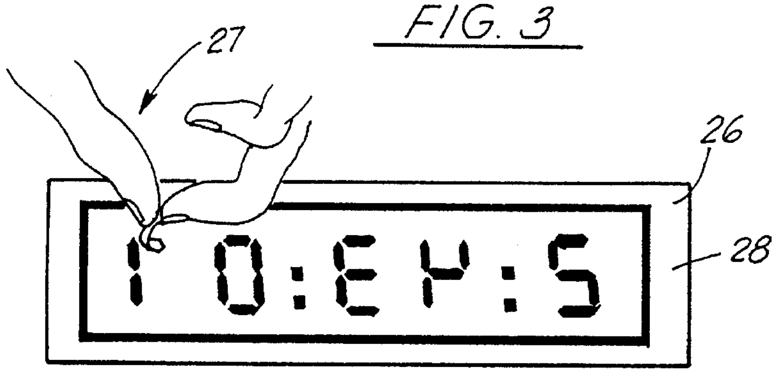

They can be manually removed from the backing. In FIG. 2A, each indicia 15–19 has a plurality of six (6) peripheral segments and one internal segment. For example, the indicia 15 has peripheral segments 15*a–f* and internal segment 15*g*. To form any number 1, 2, 3, 4, 5, 6, 7, 9, or 0, the user simply removes appropriate ones of the segments 15*a–g*. In FIG. 4, a hand of a user is designated generally by the numeral 27. In FIG. 4, various segments of each indicia 15–19 have been removed. For example, in FIG. 4, the indicia 15 has become the number "1" because five of the segments 15*a*, 15*d*, 15*e*, 15*f*, and 15*g* have been removed. The indicia 16 has become the number "0" because the single horizontal segment 16*g* has been removed. Similarly, the pair of indicia 21 that define minutes have had appropriate segments removed so that the number "88" has now become "43". The hour indicia 19 which began as a number "8" has become the number "2" by removing segments 19*c* and 19*f*.

Figure 3:
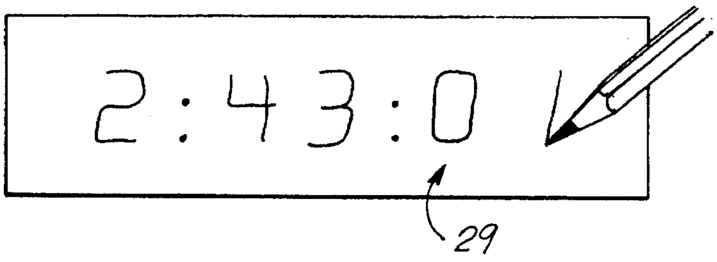
FIG. 3 is a schematic view of a method step of the present invention wherein the user inscribes a desired time on the backing paper portion thereof, prior to the removal certain segments of the various indicia.

In FIG. 4, the reverse side 28 of the transfer is shown. The transfer reverse side 28 must be placed face down on a garment 10 before heat and/or pressure is applied thereto. Reverse side 28 carries the plurality of indicia 15–19 and front surface 29 has heat and/or pressure applied thereto during the transfer to garment 10. To aid the user in picking the correcting segments, the user can simply inscribe the correct race time on the surface 29, using a pencil or marker 22 as shown in FIG. 3. The backing paper 26 is preferably semi-transparent so that the user can view the full "8" segments which are on the reverse face 28 of the paper backing 26. By writing the correct race time on the surface 29, the user then clearly sees which segments are to be removed (the pencil or ink inscription covers segments that will remain) so that the remaining segments define the proper race time. Once the unwanted segments are removed, the user places the surface 28 against the garment 10, as shown in FIG. 5, and transfers heat and/or pressure thereto using an iron or other appropriate device, designated by the numeral 5.

The backing 14 can be white for example if the tee-shirt is dark in color. If a white backing 14 is used, the indicia 15–19, the colons 23, 24, and the peripheral 25 would preferably be of a dark contrasting color such as black, navy blue, etc.

If the tee-shirt is of a lighter color, such as white, yellow, etc., the backing element 14 can be of a dark color such as black. In the use of a black background 14, the indicia 15–19, the colons 23, 24, and the peripheral element 25 would be of a lighter color such as yellow.

Figure 5:
FIGS. 5 and 6 illustrate the final method step of the present invention, namely, the application of heat to the indicia, transferring same to a garment.
Figure 6:
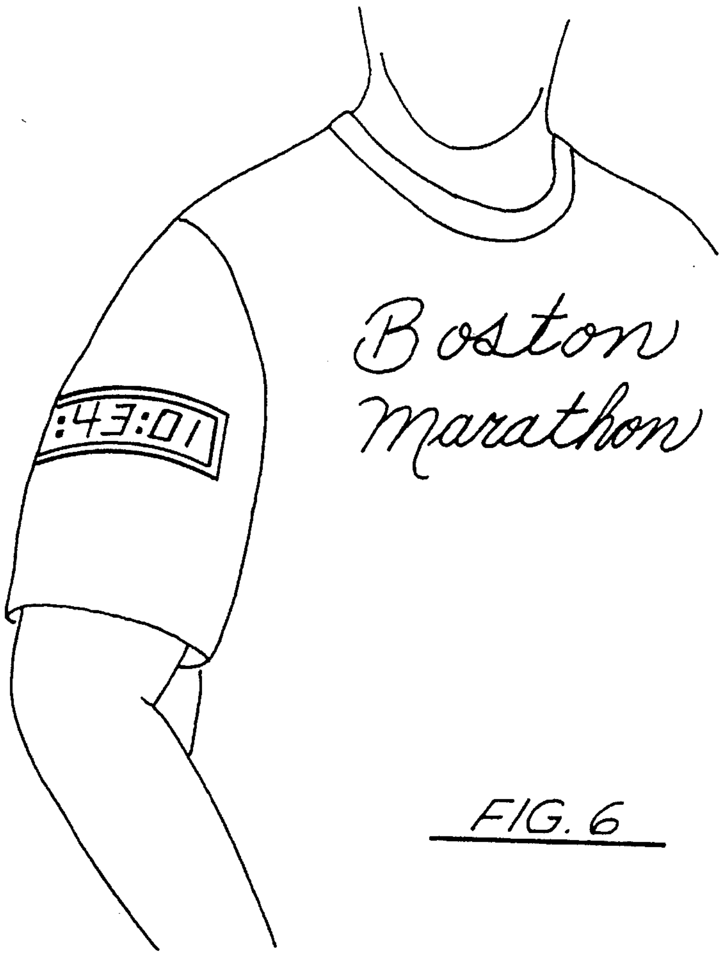

As shown in FIGS. 5 and 6, the final time is indicated by the completed number transfer 08 and can be placed on the front 11 of the garment 10, or on the sleeve 30 thereof.

The following table lists the part numbers and part descriptions as used herein and in the drawings attached hereto.

PARTS LIST

| Part Number | Description |
|---|---|
| 08 | race time transfer |
| 09 | iron |
| 10 | shirt |
| 11 | front surface |
| 12 | print |
| 13 | support surface |
| 14 | transfer |
| 15 | indicia |
| 16 | indicia |
| 17 | indicia |
| 18 | indicia |
| 19 | indicia |
| 20 | first pair |
| 21 | second pair |
| 22 | marker |
| 23 | colon |
| 24 | colon |
| 25 | border |
| 26 | paper backing |
| 27 | hand |
| 28 | reverse side |
| 29 | front side |
| 30 | sleeve |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of using a transfer for recording an athlete's race time on a garment comprising:

a) providing a backing member with a plurality of indicia each of the shape of the numeral eight, the indicia being arranged on the backing member in a least two adjacent pairs including a first pair of indicia to indicate time in seconds and a second pair of indicia to indicate time in minutes, the combination of adjacent pairs of indicia being configured of removable segments that are selectively removable from each indicia, enabling the athlete's race time to be displayed in selected minutes and seconds;

b) selecting a garment having a surface that provides a color contrast background for the plurality of indicia to be applied to the garment surface;

c) removing selected segments separately from the backing member to define said race time; and d) transferring the desired remaining segments to the garment by applying heat and/or pressure to the combination of the garment, the backing member and the desired remaining segments.

2. The method of claim 1 wherein step "a" includes aligning the plurality of indicia horizontally to define said race time.

3. The method of claim 1 wherein step "a" includes forming each indicia of a plurality of peripheral segments surrounding a separate transversely extending internal segment.

4. The method of claim 3 wherein step "a" includes forming each indicia of six peripheral segments.

5. The method of claim 1 wherein step "d" includes using heat to effect a transfer and wherein the indicia are of a thermal covered ink material.

6. The method of claim 1 step "a" includes providing a wherein backing member sheet of a coated paper material.

* * * * *